Figure 1:
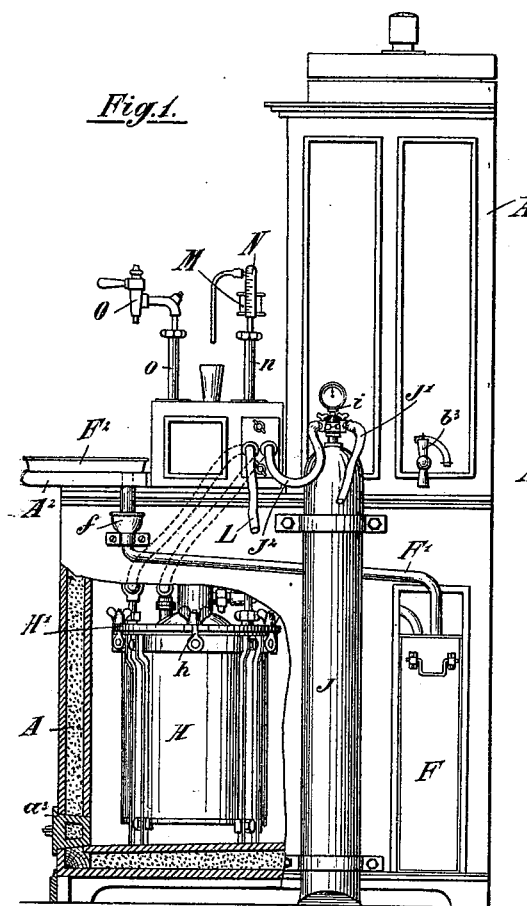

No. 646,162. Patented Mar. 27, 1900.
W. BACHNER.
APPARATUS FOR COOLING AND DISPENSING BEER OR OTHER LIQUIDS.
(Application filed Sept. 20, 1898.)
(No Model.) 2 Sheets—Sheet 1.

Witnesses:
Anton Gloetzner
N. Mitchel

Inventor:
Wilhelm Bachner
by Max George
his Attorney

No. 646,162. Patented Mar. 27, 1900.
W. BACHNER.
APPARATUS FOR COOLING AND DISPENSING BEER OR OTHER LIQUIDS.
(Application filed Sept. 20, 1898.)
(No Model.) 2 Sheets—Sheet 2.
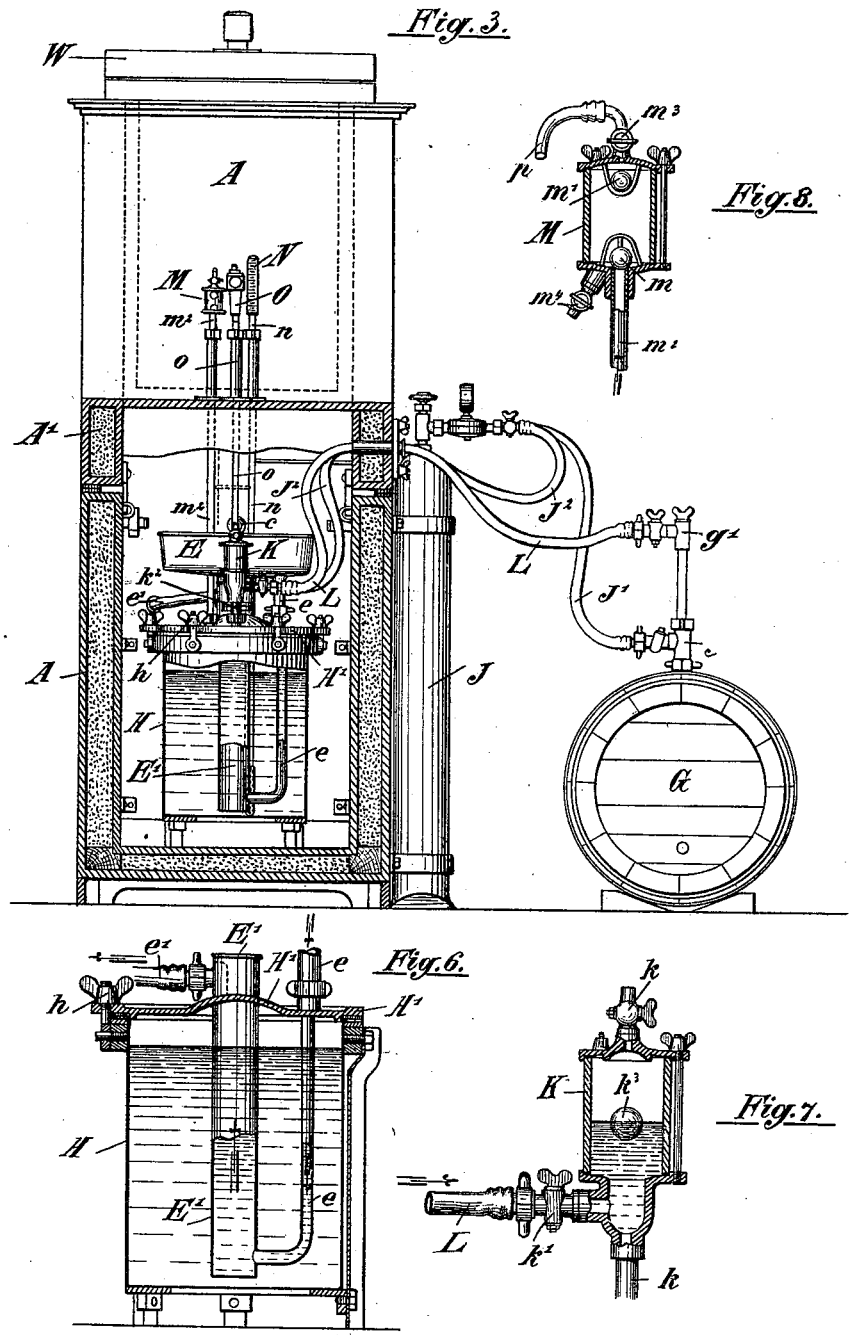
Witnesses:
Anton Gloetzner
N. Mitchell
Inventor:
Wilhelm Bachner
by Max Georgii
his attorney.

UNITED STATES PATENT OFFICE.

WILHELM BACHNER, OF STUTTGART, GERMANY.

APPARATUS FOR COOLING AND DISPENSING BEER OR OTHER LIQUIDS.

SPECIFICATION forming part of Letters Patent No. 646,162, dated March 27, 1900.

Application filed September 20, 1898. Serial No. 691,433. (No model.)

*To all whom it may concern:*

Be it known that I, WILHELM BACHNER, a citizen of the German Empire, residing at Stuttgart, in the Kingdom of Würtemberg, Germany, have invented certain new and useful Improvements in Apparatus for Cooling and Dispensing Beer or other Liquids; and I do hereby declare the following to be a full, clear, and exact description of the invention, such as will enable others skilled in the art to which it appertains to make and use the same.

This invention relates to apparatus for cooling and dispensing beer and other liquids; and it consists, substantially, in such features of improvement as will hereinafter be more particularly described.

The invention has for its object to provide a cooling and delivering apparatus for beer and other effervescent or foaming beverages; and it comprises, among other features, an ice-chest or refrigerator having a uniform and continuous air circulation.

The apparatus is constructed in front with a part formed like a sideboard or buffet, in which a beer containing or cooling tank or vessel is located, which is cooled externally by the cold air of the ice-chest or refrigerator and the contents of which are cooled internally by a separate pipe having ice-water constantly passing through it. The beer-cooling vessel may be connected with a beer-cask located outside the refrigerator and the contents of the cask transferred to the said vessel by means of an air-pump or, as shown, for instance, in the accompanying drawings, by means of carbonic-acid pressure. A separate arrangement is also employed by means of which, in case of overfilling, any loss of carbonic acid occasioned by the frothing up of the beer is avoided, since the air escaping from the refrigerator is under a certain pressure, so that the beer enters quietly. The beer is delivered by means of one or more taps directly to the sideboard or buffet-shelf of the ice-chest refrigerator, a thermometer arranged behind the taps allowing of the temperature of the said beer being directly ascertained. The cooling tank or vessel communicates with a carbonic-acid container, so that the beer is constantly under pressure.

In the accompanying drawings an ice-chest or refrigerator with continuous air circulation and a beer-cooler included therein, together with an arrangement for running the beer in and discharging same, is shown, and in which—

Figure 2:
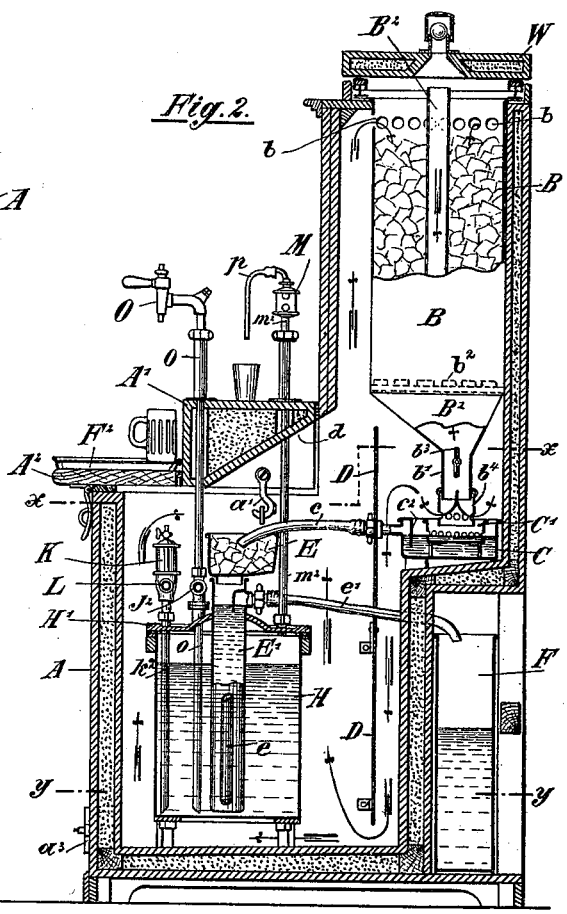
Figure 4:
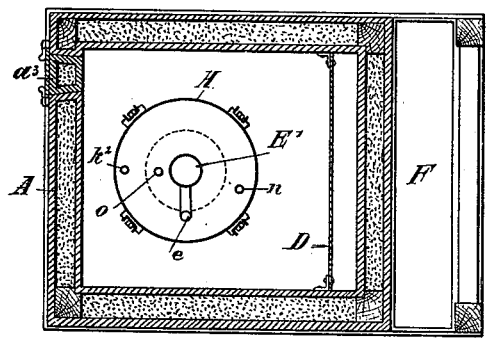
Figure 5:
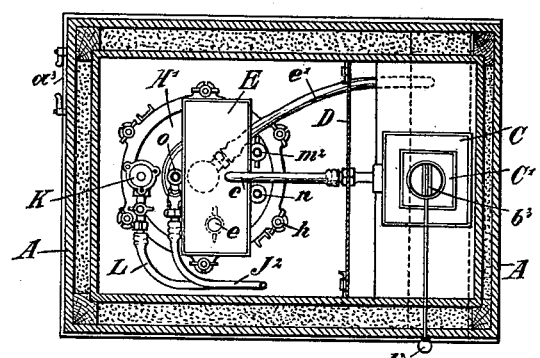

Figure 1 is a side elevation, partly in vertical section; Fig. 2, a vertical transverse section of same, and Fig. 3 a vertical front elevation in part section; Fig. 4, a cross-section on the line $y\ y$ of Fig. 2; Fig. 5, a cross-section on the line $x\ x$ of Fig. 2. Figs. 6, 7, and 8 are vertical sections, on an enlarged scale, of the beer-cooler and its appurtenances, the beer-inlet device K, and the beer-outlet device M, by means of which latter the air-outlet when the cooling vessel is filled is so regulated that no frothing of the beer takes place.

The refrigerator or ice-chest A has, preferably, the shape of a buffet-counter or sideboard, an ice-container B, closed all around, being inserted in the rear higher part of said buffet, which ice-container is closed at top by means of a lid W and has a grating $b^2$, beneath which it develops into a funnel-shaped part B' with a tubular nozzle $b'$, in which latter a throttle-valve $b^3$ is arranged, the spindle of which is carried to the outside through the wall of the ice-chest or refrigerator and carries a handle $b^{31}$, by which the throttle-valve may be opened or closed, Figs. 1 and 5. A tubular piece $b^4$, having lateral perforations, is removably fastened, preferably by means of a bayonet-joint, onto the nozzle $b'$. Holes $b$ are also formed in the sides of the upper part of the ice holder or container B, so that the cold air can only escape through the holes in $b^4$ and the warm air can only enter through the holes $b$ of the otherwise quite-closed ice-container B. A constant active air circulation is thus established in the ice-chest.

$B^2$ is a perforated tube extending centrally of the ice receptacle or container B and is for the purpose of permitting free circulation of air, which otherwise might be impeded by the clogging or close packing of the ice.

A smaller vessel C', having perforations in the sides and standing in a second somewhat-larger vessel C, for receiving or catching the water produced by the melting of the ice, is located under the tubular nozzle $b^4$. Dirt and the like accumulates on the floor of the vessel C' by settling, and as this vessel is only loosely inserted in the vessel C the same may be readily lifted out and the sediment or dirt resulting from impure ice and the like may be conveniently emptied without dirtying the water in the vessel C. The water formed by the melting of the ice is conveyed from the vessel C by a pipe $c$ into a cup E, situated above the beer containing and cooling vessel H, from whence it passes, by means of a pipe $e$, through the cooling vessel H into the lower part of a cooling-pipe E', located, preferably, in the center of the said cooling vessel. This cooling-pipe E' is carried through the cover of the vessel H and the warmer ice-water runs away at the top of the said pipe E' through a pipe $e'$ into a reservoir F for collecting the melted ice-water, which reservoir is placed outside the ice-chest A, Fig. 2, in order to allow of its being more easily emptied. If the cup E be also filled with ice, a still more rapid cooling action will be produced by the cooling-pipe E'.

The beer-cooler H, which is kept hermetically closed by means of a cover H', held down by hinge-bolts and wing-nuts $h$, is arranged in the front lower buffet or counter-like part of the ice-chest A. As this lower front part is separated from the higher rear part of the ice-chest by a partition D, which does not quite extend to the floor of the ice-chest, the heavier cold air must emerge below between the partition D and the bottom of the ice-chest and flow around the outside of the cooling vessel H. The warmer air rises up to the cover $A^2$ of the buffet part of the ice-chest, the stepped part A' of which is sloped upward or inclined at $d$ underneath toward the front wall of the ice-chest with the object of deflecting, facilitating the escape of the rising air from the buffet into the upper part of the ice-chest.

A small chamber K, Fig. 7, provided with a float-valve $k^3$ and let-off cock $k$, is mounted on a pipe $k^2$ on the beer-cooler H in the cool chamber of the buffet and may be connected by means of a tap $k'$ and pipe L with the usual drawing-off apparatus $g$ $g'$ of a cask G, the beer from which is to be conveyed into the cooler. The cask G is also connected with a carbonic-acid container J or with an air-pump by means of the tap $g$ and pipe J', so that by the pressure of the carbonic acid (or of air pumped into the cask) the beer may be transferred from the cask directly into the cooler without its being necessary to open any door or the like on the ice-holder.

In order to prevent any frothing up of the beer in its transference from the cask to the cooler, a pipe $m^2$ is located above on the cover of the cooler, which pipe is carried through the buffet-top and has at the upper end a small chamber M, Fig. 7, in the bottom of which a metal ball-valve $m$ is located, which closes the mouth of the pipe $m^2$. The escape of air from the cooler H on the entrance of the beer therein is thus rendered more difficult, as the valve must be lifted before the air can escape, or, in other words, a counter-pressure to the too-rapid entrance of the beer is created.

At the top of the small chamber M an india-rubber float-valve $m'$, held in a loop-piece or stirrup, is provided, which closes the chamber as soon as it is filled with beer. Froth or the like may escape at the top of the chamber M after the opening of the tap $m^3$ by means of a pipe $p$ into a vessel placed beneath. The chamber M may be emptied and cleaned through a tap $m^4$, located on the bottom.

The beer is withdrawn from the cooler by means of a tap O and pipe $o$, while the beer-drip falls from a dish $F^2$ into the funnel $f$ of a pipe F', and from the latter is conveyed direct into the vessel F for catching the water arising from the melting of the ice.

The advantage of this improved ice-chest or refrigerator with supply-buffet and separate cooler consists, essentially, in the beer being always well and equally cooled, and the beer can be kept for a long time without deteriorating in quality. The transfer of the beer from the cask into the cooler is effected in a simpler and more rapid manner without frothing and without necessitating the opening of the ice-chest. The consumption of ice is very small, while the cooling is most effective.

A draw-off tap or plug $a^3$ is located on the front of the bottom of the chest, which bottom also slopes toward the front to allow of the waste water being run off and to facilitate the cleaning.

Having now particularly described and ascertained the nature of my said invention and in what manner the same is to be performed, I declare that what I claim is—

1. In an apparatus for cooling and dispensing beverages the combination with the sideboard substantially as set forth, the ice-containing vessel located in the upper smaller part of the sideboard, the beverage-containing vessel located in the lower larger part of the sideboard, of a second receptacle for ice located on top of said beverage-cooling vessel, means for conveying the water from the melting ice in the said upper ice-container to said latter ice-container, and means for passing the water from the melting ice in said latter ice-container through the said beverage-containing vessel and then out of the sideboard, substantially as set forth.

2. In an apparatus for cooling and dispensing beverages the combination with the sideboard substantially as set forth, of an ice-containing vessel located in the upper smaller part of the sideboard, the beverage-containing vessel located in the lower larger part of the sideboard, a U-shaped vessel extending downwardly into said beverage-containing vessel, a second receptacle for ice located on top of said beverage-containing vessel, means for conveying the water from the melting ice in said upper ice-container to said latter ice-container, and means for passing the water of melting from said latter ice-container through said U-shaped vessel, and then out of the sideboard, substantially as set forth.

In testimony whereof I affix my signature in presence of two witnesses.

WILHELM BACHNER.

Witnesses:
 AUGUST DRAUTZ,
 H. WAGNER.